United States Patent
Chien et al.

(10) Patent No.: US 7,046,345 B2
(45) Date of Patent: May 16, 2006

(54) APPARATUS FOR PRECISE DISTANCE MEASUREMENT

(75) Inventors: Pie-Yau Chien, Taichung Hsien (TW);
Dong Huang, Hang-Zhou (CN);
Kuo-Hua Yang, Taichung Hsien (TW);
Dan Duan, Hang-Zhou (CN)

(73) Assignee: Asia Optical Co., Inc., T.E.P.E. (TW)

( * ) Notice: Subject to any disclaimer, the term of this patent is extended or adjusted under 35 U.S.C. 154(b) by 165 days.

(21) Appl. No.: 10/756,053

(22) Filed: Jan. 12, 2004

(65) Prior Publication Data
US 2005/0151956 A1 Jul. 14, 2005

(51) Int. Cl.
*G01C 3/08* (2006.01)

(52) U.S. Cl. ..................................... 356/5.1
(58) Field of Classification Search ............ 356/5.1
See application file for complete search history.

(56) References Cited
U.S. PATENT DOCUMENTS
5,075,878 A * 12/1991 Ohtomo et al. ............ 702/176

5,955,671 A * 9/1999 Gilmore et al. ............... 73/597
6,233,444 B1 * 5/2001 Nakanishi .................... 455/313
6,255,858 B1 * 7/2001 Akiyama et al. ............. 327/12

* cited by examiner

Primary Examiner—Thomas H. Tarcza
Assistant Examiner—Luke Ratcliffe
(74) Attorney, Agent, or Firm—Dellett & Walters

(57) ABSTRACT

An apparatus for precise distance measurement has a multiple frequency generator, a laser transmitter, an optical receiver, a first measuring unit, a second measuring unit and a central processing unit. The laser transmitter outputs a light signal to a target, and the optical receiver receives the reflected light signal and mixes the base frequency signal from the multiple frequency generator and the reflected light signal and further outputs an measurement signal to the first and second measuring units. The first and second measuring units calculate respectively a time difference and a phase difference between the light signal and the reflected light signal. The central processing unit is connected to the first and second measuring units to calculate a precise distance by the time and the phase difference.

10 Claims, 5 Drawing Sheets

US 7,046,345 B2

APPARATUS FOR PRECISE DISTANCE MEASUREMENT

BACKGROUND OF THE INVENTION

1. Field of the Invention

The present invention relates to an apparatus for precise distance measurement, and specifically to an apparatus that precisely measures a distance between the apparatus and a target.

2. Description of Related Art

U.S. Pat. No. 5,075,878 discloses a laser measurement device for measuring the distance between the device and a target. The laser measurement device uses a zero crossing detection method to calculate the distance. With reference to FIGS. 5A and 5B, the device processes a reflected analog input signal to calculate the distance by the zero crossing detection method, and then outputs a square wave signal. With further reference to FIG. 5B, the duration of the square wave signal is measured by a high frequency signal and then the device will obtain the phase $\phi$.

But the laser measurement device disclosed in U.S. Pat. No. 5,075,878 had some shortcomings. When the reflected input signal includes DC bias signal, a zero point offset is generated in the reflected input signal. The zero point offset injects an error into the zero crossing detection method. Furthermore, a reference signal has noise signals so the device executes the square wave signal with multiple small pulses corresponding to the noises. The small pulses affect the phase accuracy.

The laser measurement device in U.S. Pat. No. 5,075,878 uses many elements and complex circuits and does not have good performance when measuring distance.

The present invention provides an apparatus for precise distance measurement to mitigate or obviate the aforementioned problems.

SUMMARY OF THE INVENTION

An object of the present invention is to provide an apparatus for precise distance measurement that uses simple circuit, fewer elements and phase offset to measure the distance between the apparatus and a target.

To have the above object, the present invention has a multiple frequency generator, a laser transmitter, optical receiver, a first measuring unit, a second measuring unit and a central processing unit.

The multiple frequency generator generates multiple different frequency signals to the laser transmitter, the optical receiver, a first and second measuring unit. The laser transmitter outputs a light signal with a specific frequency modulated to a target and the light signal will be reflected to the optical receiver having frequency mixing function. The optical receiver mixes the reflected light signal with the specific frequency and another frequency signal from the multiple frequency generator and then outputs a measurement signal to the first and second measuring units. The first measuring unit measures a time difference between the light signal and the reflected light signal. The second measuring unit calculates a phase difference between the light signal and the reflected light signal. The central processing unit obtains the time difference and the phase difference and further calculates a distant between the apparatus and the target.

As mentioned above, the present invention uses the optical receiving unit to mix the reflected light signal and one frequency signal to output a measurement signal so the present invention need not employ extra electronic mixer to generate the measurement signal. Therefore, the present invention avoids the worse signal noise rate (SNR) which is caused by the electronic mixer and the photoelectric conversion device. Therefore the present invention has high precise distance measurement capability.

Another objective of the present invention is to provide a new phase measuring method to calculate the phase difference precisely and further increase measurement accuracy.

The new phase measuring method, which measures the phase difference with an IQ orthogonal phase measuring method, is implemented to the second measuring unit. The new phase measuring method is to delay a reference signal's phase to $$\frac{\pi}{2}$$

phase which is orthogonal with the measurment signal. Then, the original reference signal and the reference signal with $$\frac{\pi}{2}$$

delay phase respecively multiplies by the measurment signal to output two DC values. The two DC values are divided to obtain a trigonometric function with a phase difference. Then the phase difference is calculated according to the trigonometric function. Thus, the second measuring unit can calculate the phase difference precisely.

Other objects, advantages and novel features of the invention will become more apparent from the following detailed description when taken in conjunction with the accompanying drawings.

DETAILED DESCRIPTION OF THE PREFERRED EMBODIMENT

Figure 1:
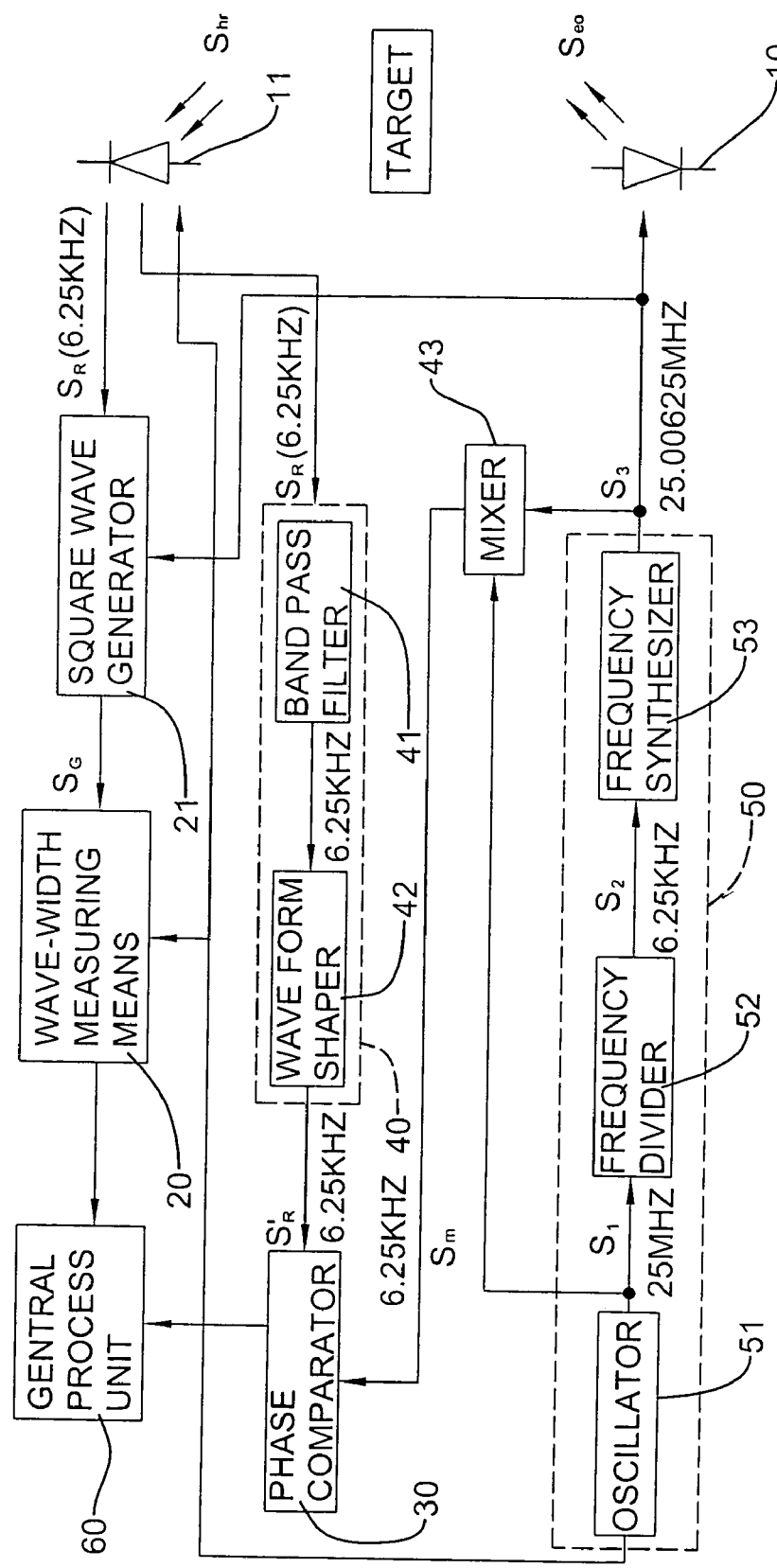
FIG. 1 is a functional block diagram of a first embodiment of an apparatus for precise distance measurement in accordance with the present invention.

With reference to FIG. 1, a first embodiment of the present invention includes a multiple frequency generator (50), a laser transmitter (10), an optical receiver (11), a first measuring unit (not numbered), a second measuring unit (not numbered) and a central processing unit (60).

The multiple frequency generator (50) generates a base frequency ($S_1$) an interim frequency ($S_2$) and a transmission frequency ($S_3$), and comprises an oscillator (51), a frequency divider (52) and a frequency synthesizer (53) The oscillator (51) generates the base frequency ($S_1$). The frequency divider (52) is connected to the oscillator (51) and receives the base frequency ($S_1$) from the oscillator (51) to output the interim signal ($S_2$). The frequency synthesizer (53) is connected to the oscillator (51) and the frequency divider (52) to generate a transmission signal ($S_3$). In a first embodiment, the frequency of the base signal ($S_1$) is25 MHz. The base signal ($S_1$) is divided to the interim signal ($S_2$) with a fixed frequency by the frequency divider (52). In this embodiment, the fixed frequency of the interim signal ($S_2$) is 6.25KHz. The transmission signal ($S_3$) is a fixed frequency of 25.00625MHz. The transmission signal ($S_3$) is transmitted to the laser transmitter(10), the mixer(43) and the square wave generator(21). The laser transmitter (10) is connected to the frequency synthesizer (53) and transmits a light signal ($S_{eo}$) at the transmission signal ($S_3$) to a target (not numbered). The target reflects the light signal ($S_{eo}$) to the optical receiver (11). Therefore, the reflected light signal ($S_{hr}$) includes the transmission signal (S3) with a phase delay.

The optical receiver (11) is connected to the oscillator (51) to obtain the base signal ($S_1$) and mixes the base signal ($S_1$) and the reflected light signal ($S_{hr}$) to generate a measurement signal ($S_R$). Because the reflected light signal ($S_{hr}$) is an attenuated version of the transmission signal ($S_3$) with a delay based on the path, the measurement signal ($S_R$) has the delay.

The second measuring unit is connected to the optical receiver (11) to receive the measurement signal ($S_R$) therefrom and includes a phase comparator (30), a mixer (43) and a signal corrector (40). The signal corrector (40) is connected between the phase comparator (30) and the optical receiver (11) and has a band-pass filter (41) and a wave form shaper (42). The band-pass filter (41) is connected between the optical receiver (11) and the wave form shaper (42). The band-pass filter (41) filters low frequency noise out of the measurement signal ($S_R$) to make the measurement signal ($S_R$) a sine wave signal. Then the wave form shaper (42) modifies the sine wave to a square wave. The modified measurement signal ($S_R'$) is only processed by the signal corrector (40) to modify the square shape so the modified measurement signal ($S_R'$) has the same frequency as the measurement signal ($S_R$) from the optical receiver (11). In addition to being connected to the signal corrector (40), the phase comparator (30) is further connected to the central processing unit (60) and the mixer (43). The mixer (43) provides a reference signal ($S_m$) for the phase comparator (30) that is the same frequency (6.25 KHz) as the modified measurement signal ($S_R'$). Therefore, the phase comparator (30) calculates a phase difference between the light signal ($S_{eo}$) and the reflected light signal ($S_{hr}$) by comparing the measurement signal ($S_R'$) and the reference signal ($S_m$).

The first measuring unit includes a square wave generator (21) and a wave-width measuring means (20). The square wave generator (21) is connected to the optical receiver (11) and the frequency synthesizer (53). The square wave generator (21) starts outputting a square wave signal upon receiving the measurement signal and stops outputting the square wave signal upon receiving the transmission signal ($S_3$). The wave-width measuring means (20) measures the width of the square wave signal by using the base signal ($S_1$) from the oscillator (51).

Figure 2:
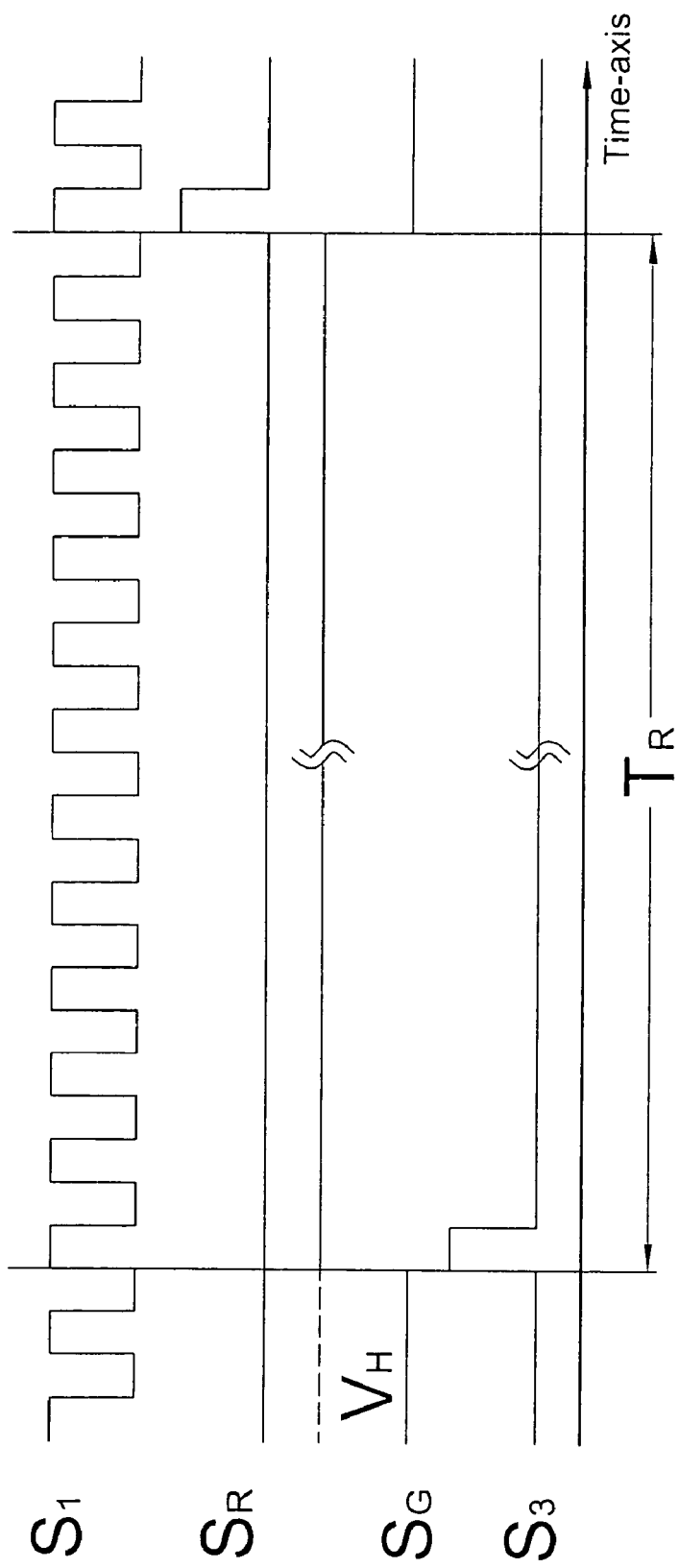
FIG. 2 is a timing diagram of a first measurement module in accordance with the present invention.

With reference to FIG. 2, as the laser transmitter (10) receives the transmission signal ($S_3$) and begins emitting a light beam ($S_{eo}$) to a target, square wave generator (21) receives the transmission signal ($S_3$) and triggers and holds a voltage level $V_H$ at the same time. After the optical receiver (11) receives the light beam ($S_{hr}$) reflected from the target and outputs the measurement signal ($S_R$) to the square wave generator (21), the square wave generator (21) restores the voltage level to original status. Thus, the square wave generator (21) outputs the square wave signal ($S_G$) to the wave-width measuring means (20). The wave-width measuring means (20) calculates the wave-width of the square wave signal ($S_G$). The wave-width of the square wave signal ($S_G$) is represented as a time difference between the light beam ($S_{eo}$) and the reflected light beam ($S_{hr}$). The wave-width measuring means (20) will send the time difference to the central processing unit (60).

Figure 3:
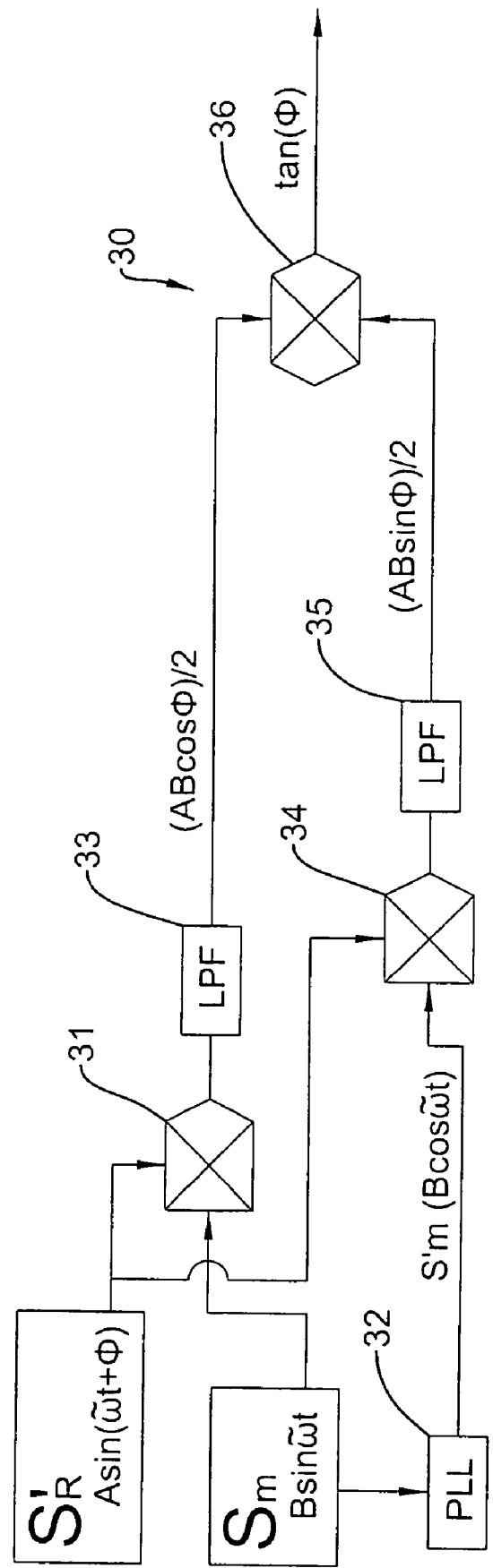
FIG. 3 is a block diagram of a phase comparator of the apparatus for precise distance measurement in accordance with the present invention.

The phase comparator (30) calculates the phase difference by an IQ orthogonal phase measuring method. With reference to FIG. 3, the phase comparator (30) has a first mixer (31), a phase locked loop (PLL) (32), a first low pass filter (LPF) (33), a second mixer (34), a second low pass filter (LPF) (35) and a logic arithmetic element (36). The first mixer (31) receives inputs from the signal corrector (40) and the mixer (43), and sends an output to the first LPF (33). The modified measurement signal ($S_R'$) is in the form A sin($\overline{\omega}t+\phi$), and the reference signal ($S_m$) is in the form $\beta$ sin($\overline{\omega}t$). The first mixer (31) mixes the modified measurement signal ($S_R'$) and the reference signal ($S_m$), and then outputs a mixed signal to the first LPF (33) to generate a first DC value $$\left(\frac{AB\cos\phi}{2}\right).$$

The second mixer (34) is connected to the wave form shaper (42) and the second LPF (35). The second mixer (34) receives inputs from the wave form shaper (42) in the signal corrector (40) and the mixer (43) through the PLL (32).

The first mixer (31) mixes the modified measurement signal ($S_R'$) and the reference signal ($S_m$) and then outputs a mixed signal to the first LPF (33) to generate a first DC value $$\left(\frac{AB\cos\phi}{2}\right).$$

The PLL (32) delays the reference signal ($S_m$) to $$\frac{\pi}{2}$$

phase so the delay reference signal ($S_m'$) is represent to B cos($\overline{\omega}t$). The delay reference signal ($S_m'$) is further input to the second mixer (34) to mix with the modified measurement signal ($S_R'$). The second mixer (34) outputs a second mixed signal to the second LPF (33) to generate a second DC value $$\left(\frac{AB\sin\phi}{2}\right).$$

Therefore, the phase comparator (30) outputs a first DC value and second DC value to the central processing unit (60) through the logic arithmetic element (36). The logic arithmetic element (36) could be a division device to divide the first and second DC values. The first and second DC signals are orthogonal so the division device generates tan φ and further outputs tan φ to the central processing unit (60). The central processing unit (60) obtains the phase difference (φ) and the time difference from the first and second measuring units. Therefore, the phase comparator (30) calculates the phase difference based on the orthogonal relationship. The present invention does not use the zero crossing detection method to calculate the phase difference so even if the modified measurement signal ($S_R'$) has a DC voltage, the phase comparator (30) can calculate the correct phase difference.

Figure 4:
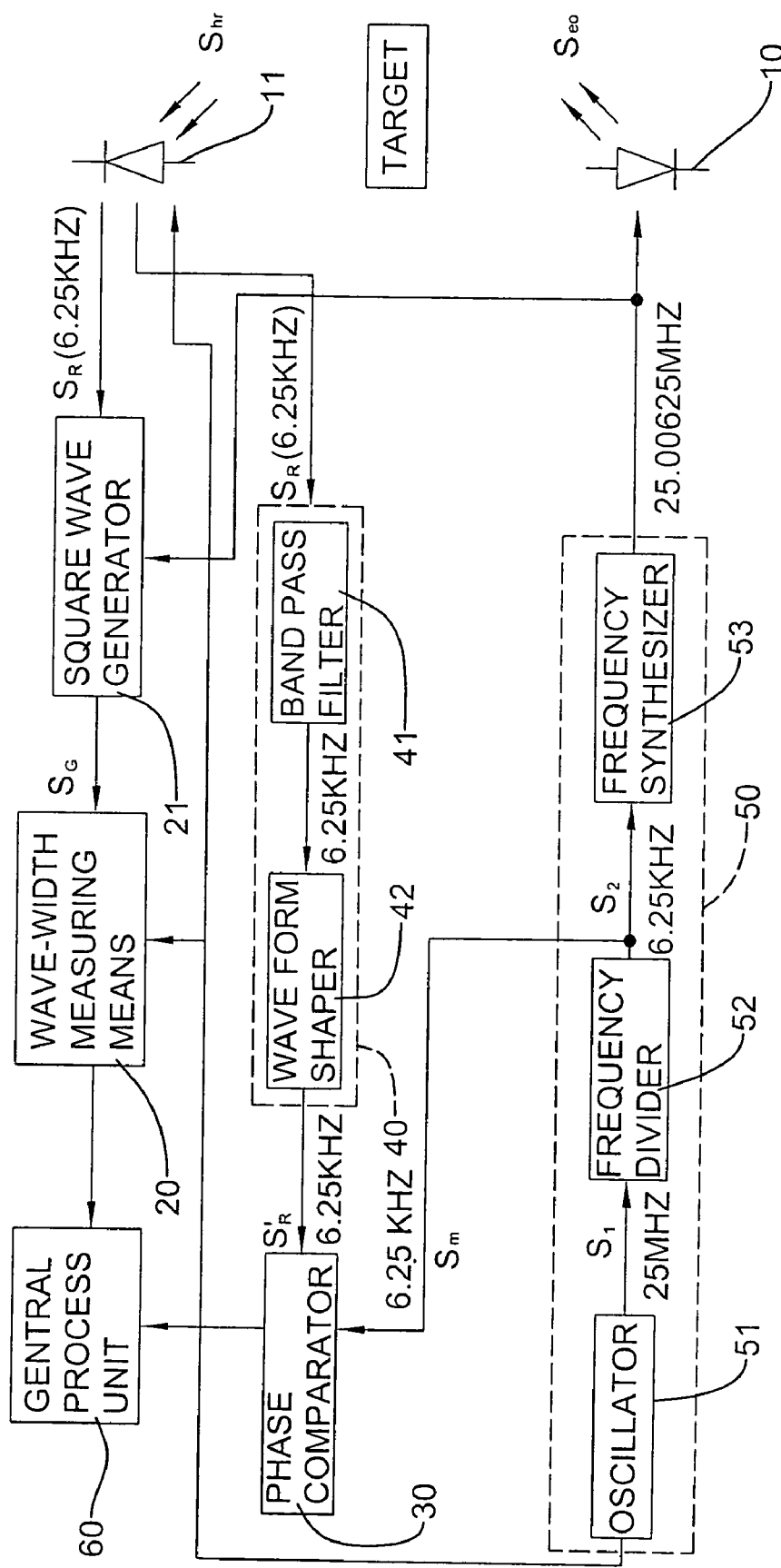
FIG. 4 is a functional block diagram of a second embodiment of an apparatus for precise distance measurement in accordance with the present invention.
Figure 5A:
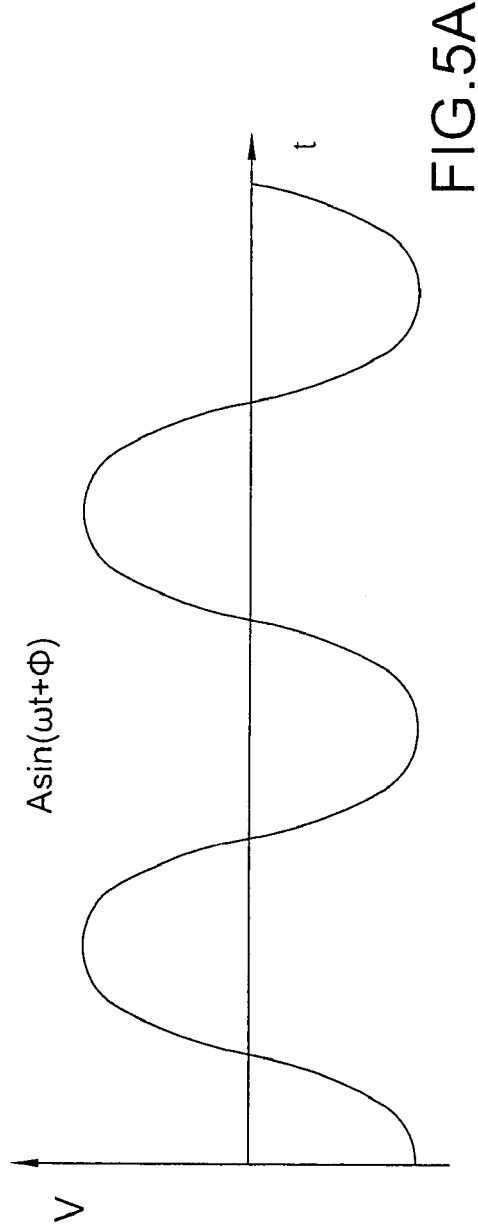
FIG. 5A is a graph of a reflected input signal.
Figure 5B:
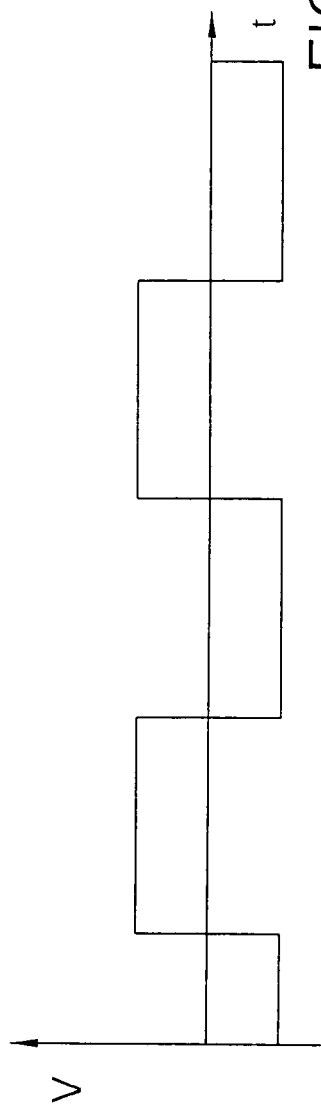
FIG. 5B is a graph of the results of transforming the reflected input signal in FIG. 5A with a real time zero phase measuring method in accordance with the prior art.

With reference to FIG. 4, a second embodiment of the present invention eliminates the mixer (43) between the multiple frequency generator (50) and the second measuring unit from the first embodiment. Consequently, the phase comparator (30) is connected directly to the frequency divider (52) to obtain a interim signal having a frequency that is the same as the mixed frequency of the reference signal ($S_m$) in the first embodiment.

Based on the forgoing description, the present invention measures distance by calculating the phase difference and time difference between the light signal and the reflected light signal. The optical receiver (11) can mix the reflected signal ($S_{hr}$) and the base signal ($S_1$), so the central processing unit can calculate the phase difference between the light signal ($S_{eo}$) and the reflected light signal ($S_{hr}$) and further calculate the distant between the present invention and the target.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An apparatus for precise distance measurement, comprising:
    a multiple frequency generator that generates a base signal, an interim signal and a transmission signal;
    a laser transmitter connected to the multiple frequency generator to output a light signal with the transmission signal to a target;
    an optical receiver that receives the light signal from the laser transmitter reflected by a target and outputs a measurement signal; wherein the optical receiver is connected to the multiple frequency generator and mixes the base signal and the reflected light signal to output a measurement signal;
    a first measuring unit connected to the multiple frequency generator and the optical receiver obtains a time difference by calculating a time difference between the measurement signal and the transmission signal;
    a second measuring unit connected between the multiple frequency generator and the optical receiver to calculate a phase difference by comparing the measurement signal and the interim signal, wherein the second measuring unit comprises:
    a signal corrector connected to the optical receiver to modify the measurement signal's wave form and generate a modified measurement signal, wherein the signal corrector comprises a band-pass filter connected to the optical receiver and a wave form shaper connected to the band-pass filter and the phase comparator;
    a phase comparator connected to the wave form shaper of the signal corrector and the multiple frequency generator to calculate the phase difference between the interim signal and the modified measurement signal; and
    a central processing unit connected to the first and second measuring units to calculate a distance between the laser transmitter and a target by the time difference and the phase difference.

2. The apparatus as claimed in claim 1, wherein the multiple frequency generator comprises:
    an oscillator that generates the base signal;
    a frequency divider connected to the oscillator, wherein the frequency divider divides the base signal to the interim signal; and
    a frequency synthesizer connected to the frequency divider to generate the transmission signal.

3. The apparatus as claimed in claim 1, wherein the first measuring unit comprises:
    a square wave generator connected to the optical receiver and the multiple frequency generator to generate a square wave signal; and
    a wave width measuring unit connected to the square wave generator and the multiple frequency generator to calculate a wave width of the square wave signal.

4. The apparatus as claimed in claim 1, wherein the phase comparator comprises:
    a first mixer connected to the optical receiver and the multiple frequency generator mixed the measurement signal and the interim signal;
    a first low pass filter connected to the first mixer to output a first DC value;
    a phase locked loop (PLL) connected to multiple frequency generator to generate a delay interim signal with a π/2 phase delay;
    a second mixer connected between the PLL and the optical receiver to mix the delay interim signal and the measurement signal;
    a second low pass filter connected to the second mixer to output a second DC value; and
    a logic element connected to the first and second low pass filters to calculate the phase difference by dividing the first and second DC values.

5. The apparatus as claimed in claim 4, wherein the signal corrector is composed of a band-pass filter connected to the optical receiver and a wave form shaper connected to the band-pass filter and the phase comparator.

6. An apparatus for precise distance measurement, comprising:
    a multiple frequency generator that generates a base signal, an interim signal and a transmission signal;
    a laser transmitter connected to the multiple frequency generator to output a light signal with the transmission signal to a target;
    an optical receiver that receives the light signal from the laser transmitter reflected by a target and outputs a measurement signal; wherein the optical receiver is connected to the multiple frequency generator and mixes the base signal and the reflected light signal to output a measurement signal;
    a first measuring unit connected to the multiple frequency generator and the optical receiver obtains a time difference by calculating a time difference between the measurement signal and the transmission signal;
    a second measuring unit connected between the multiple frequency generator and the optical receiver to calculate a phase difference by comparing the measurement signal and the interim signal, wherein the second measuring unit comprises:
  a signal corrector connected to the optical receiver to modify the measurement signal, wherein the signal corrector comprises a band-pass filter connected to the optical receiver and a wave form shaper connected to the band-pass filter;
  a mixer connected to the multiple frequency generator to mix the transmission signals to generate a reference signal; and
  a phase comparator connected to the wave form shaper of the signal corrector and the mixer to calculate the phase difference between the reference signal and the measurement signal; and
  a central processing unit connected to the first and second measuring units to calculate a distance between the laser transmitter and a target by the time difference and the phase difference.

7. The apparatus as claimed in claim 6, wherein the multiple frequency generator comprises:
  an oscillator that generates the base signal;
  a frequency divider connected to the oscillator, wherein the frequency divider divides the base signal to the interim signal; and
  a frequency synthesizer connected to the frequency divider to generate the transmission signal.

8. The apparatus as claimed in claim 6, wherein the first measuring unlit comprises:
  a square wave generator connected to the optical receiver and the multiple frequency generator to generate a square wave signal; and
  a wave width measuring unit connected to the square wave generator and the multiple frequency generator to calculate a wave width of the square wave signal.

9. The apparatus as claimed in claim 6, wherein the phase comparator comprises:
  a first mixer connected to the optical receiver and the multiple frequency generator mixed the measurement signal and the interim signal;
  a first low pass filter connected to the first mixer to output a first DC value;
  a phase locked loop (PLL) connected to multiple frequency generator to generate a delay interim signal with a $\pi/2$ phase delay;
  a second mixer connected between the PLL and the optical receiver to mix the delay interim signal and the measurement signal;
  a second low pass filter connected to the second mixer to output a second DC value; and
  a logic element connected to the first and second low pass filters to calculate the phase difference by dividing the first and second DC values.

10. The apparatus as claimed in claim 9, wherein the signal corrector is composed of a band-pass filter connected to the optical receiver and a wave form shaper connected to the band-pass filter and the phase comparator.

\* \* \* \* \*